United States Patent [19]

Myers

[11] Patent Number: 4,876,794

[45] Date of Patent: Oct. 31, 1989

[54] VARIABLE MECHANICAL ADVANTAGE DEVICE UTILIZING A RADIAL CAM

[75] Inventor: Herman A. Myers, Hopwood, Pa.

[73] Assignee: Radia-Cam Inc., Hopwood, Pa.

[21] Appl. No.: 218,813

[22] Filed: Jul. 13, 1988

[51] Int. Cl.⁴ ............................................... B26B 13/00

[52] U.S. Cl. ........................................ 30/252; 30/247; 74/54; 74/567

[58] Field of Search ...................................... 74/54–57, 74/567, 569; 30/247, 252, 228, 250, 245

[56] References Cited

U.S. PATENT DOCUMENTS

| | | | |
|---|---|---|---|
| 650,687 | 5/1900 | Leask | 30/252 |
| 1,578,364 | 3/1926 | Recen . | |
| 1,818,900 | 8/1931 | MacNamee | 30/247 |
| 1,860,317 | 5/1932 | Clark | 30/247 X |
| 2,250,393 | 7/1941 | Rado | 180/79.2 |
| 2,706,415 | 4/1955 | Curtis | 74/54 |
| 3,290,533 | 12/1966 | Ammerman | 313/77 |
| 3,386,205 | 6/1968 | Herr | 49/220 |
| 3,386,294 | 6/1968 | Waldenburger et al. | 74/54 |
| 3,529,480 | 9/1970 | Kaspareck | 74/63 |
| 3,643,141 | 2/1972 | Jackson, Jr. | 318/162 |
| 3,767,135 | 10/1973 | Booth | 242/107 |
| 4,069,724 | 1/1978 | Sobotta | 74/569 |
| 4,518,181 | 5/1985 | Yamada | 292/201 |
| 4,570,500 | 2/1986 | Richter | 74/54 |

*Primary Examiner*—Douglas D. Watts

*Attorney, Agent, or Firm*—Webb, Burden, Ziesenheim & Webb

[57] ABSTRACT

This invention relates to radial cams and tools utilizing radial cams. The radial cam includes a flat plate having at least a first flat surface and a spiral groove therein having a spiral track formed of a plurality of tracks having progressively smaller radii and including an outermost track, innermost track and intermediate tracks therebetween. A return slot connects the innermost track to the outermost track whereby a continuous groove is formed. A device utilizing this cam includes a base, the above described cam pivotally mounted to the base, a cam follower slidably received in the continuous groove and a at least one lever arm pivotally attached to the cam follower and the base.

49 Claims, 7 Drawing Sheets

VARIABLE MECHANICAL ADVANTAGE DEVICE UTILIZING A RADIAL CAM

BACKGROUND OF THE INVENTION

1. Field of the Invention

This invention relates generally to cams of varying diameter and, more particularly, to cams used to generate tremendous mechanical advantage.

2. Description of the Prior Art

Devices of the type herein utilize the concept of mechanical advantage. Mechanical advantage by definition is the ratio of the force produced by a machine, such as a lever and fulcrum arrangement, to the force applied thereto. The common scissors illustrates this concept. Basically, the scissors include two lever arms each having a handle section and a cutting section. The lever arms are connected to each other via a pivot point where the handles are moved a greater distance than the cutting edges so that an increased cutting force can be exerted by the cutting edges. The greater the distance the handles move in relation to the cutting edges, the higher the mechanical advantage. Physical constraints usually limit the length of the handles and, accordingly, limits the mechanical advantage of the scissors. This is also true in any device utilizing a lever/fulcrum arrangement.

It is an object of the present invention to provide a designed mechanism having a greatly increased mechanical advantage.

It is also an advantage to provide such a machine which is uncomplicated in design, is easy to manufacture and use, and is not unwieldly in operation.

SUMMARY OF THE INVENTION

I have invented a cam which includes a flat plate having at least a first flat surface and having a spiral groove in the first flat surface. The spiral groove is formed of a plurality of tracks having progressively smaller radii and includes an innermost somewhat circular track and an outermost track. The cam further includes a return slot connecting the innermost track to the outermost track with the tracks and the return slot forming a continuous groove on the flat surface.

In one embodiment of the present invention, the cam is used in a mechanical advantage device including a base to which the cam is pivotally mounted and a cam follower slidably received in the continuous groove of the cam. A lever arm has one end pivotally attached to the cam follower and is also pivotally attached to the base intermediate its ends and means are provided for rotating the cam.

In another embodiment, the cam is used in a tool including a body to which the cam is pivotally mounted and means are provided for rotating the cam so that the cam rotates about an axis passing through the cam centrally positioned with respect to the spiral groove. A cam follower is slidably received in the continuous groove of the cam and an arm is provided having two ends, where one end is pivotally mounted to the cam follower, and the first arm is pivotally attached to the body intermediate its two ends so that the arm can rotate about an axis parallel to the axis centrally positioned with respect to the spiral groove of the cam.

Another embodiment of a tool includes a body to which a cam is pivotally mounted. The cam includes a first flat surface and a substantially second flat surface. Both the first and second flat surfaces have a spiral groove formed of a plurality of tracks having progressively smaller radii and includes at least an innermost track and an outermost track. A return slot connects the innermost track to the outermost track with the tracks and the return slot forming a continuous groove thereon. Means are provided for rotating the cam about an axis passing through the cam centrally positioned with the first surface spiral groove and the second surface spiral groove. A first cam follower is slidably received by the first surface continuous groove and a second cam follower is slidably received by the second surface spiral groove. A first arm is provided having two ends with one end pivotally mounted to the first cam follower. The first arm is pivotally mounted to the body intermediate its two ends so that the first arm can rotate about an axis parallel to the axis passing through the cam. A second arm has two ends with one end pivotally mounted to the second cam follower. The second arm is pivotally mounted to the body intermediate its two ends so that the second arm can rotate about an axis passing through the second cam. In another embodiment, two separate cams are provided, each having a continuous groove on a flat surface rather than a cam having two flat surfaces with a continuous groove provided on each surface.

Another embodiment of the present invention is a device for raising and lowering and includes a base and a cam pivotally mounted thereto. The cam includes a flat plate having a spiral groove therein. The spiral groove is formed of a plurality of tracks having progressively smaller radii and includes at least an innermost track and an outermost track. A return slot connects the innermost track to the outermost track with the tracks and the return slot forming a continuous groove on the flat surface. Means for rotating the cam about an axis passing through the cam centrally positioned with respect to the spiral groove are provided as well as a cam follower slidably received in the continuous groove of the cam. A driving arm having two ends has one end pivotally mounted to the cam follower and another end pivotally mounted to an attachment plate. The driving arm is pivotally mounted to the base intermediate of its two ends so that the driving arm can rotate about an axis parallel to the axis passing through the cam.

DESCRIPTION OF THE PREFERRED EMBODIMENTS

The FIGS. show several embodiments of radial cams and radial cam driven tools in accordance with my invention. The cams are essentially flat, circular discs or plates having a spiral groove on one or both flat surfaces. Each spiral groove has a plurality of tracks with progressively smaller radii. A lever arm is placed in communication with the spiral groove via a cam follower that is received therein.

Figure 1:
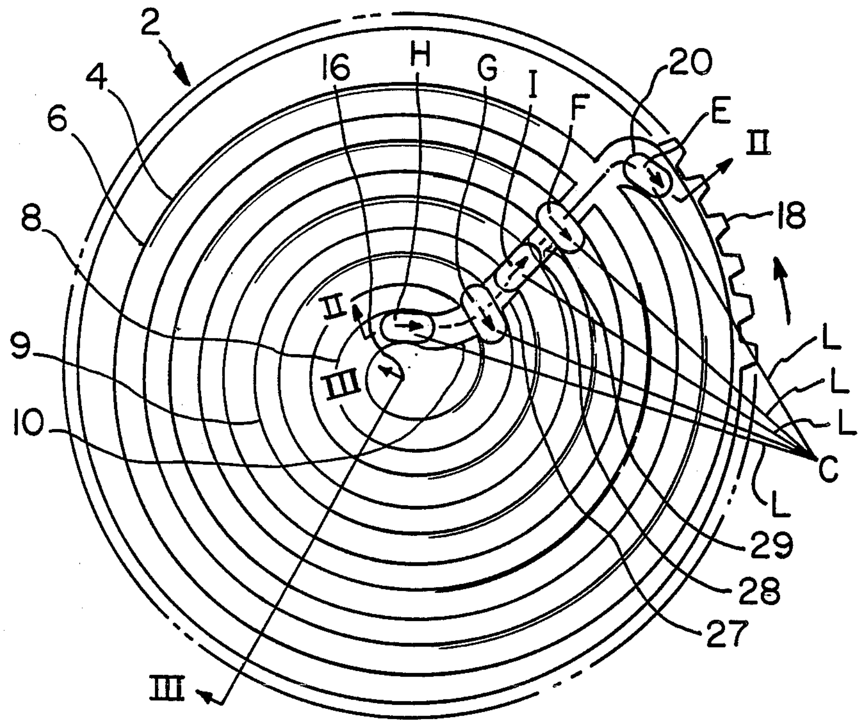
FIG. 1 is a top view of one embodiment of a radial cam in accordance with the present invention.
Figure 2:
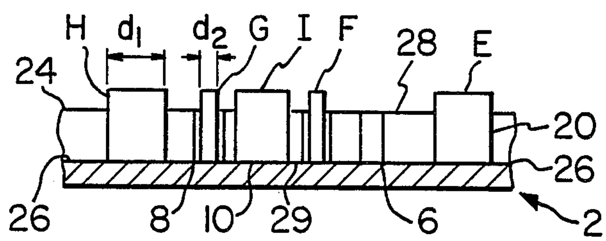
FIG. 2 is a section on line II—II in FIG. 1.
Figure 3:
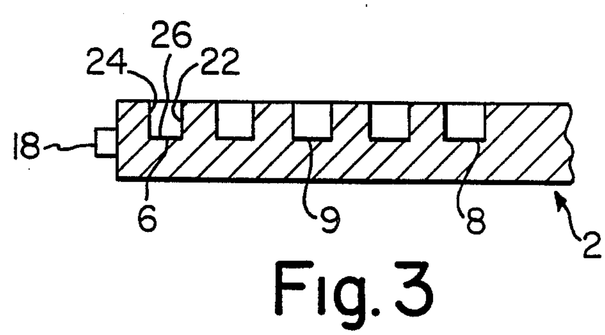
FIG. 3 is a section on line III—III in FIG. 1.

FIGS. 1–3 illustrate one embodiment of a radial cam 2 in accordance with my invention. The cam 2 includes on one surface thereof a clockwise spiral groove 4 that is made up of a plurality of tracks. The tracks include an outermost track 6, an innermost track 8 and one or more intermediate tracks 9. A return slot 10 connects the innermost track 8 to the outermost track 6 of the spiral groove 4 and passes across the intermediate tracks 9. Thus, a continuous groove is provided on the cam 2.

The cam 2 has a center 16 and a plurality of gear teeth 18 about its outer perimeter. An oblong-shaped cam follower 20 is received within and tracks the path of the spiral groove 4 or return slot 10. The cam follower 20 preferably has a major diameter $d_1$ which is larger than the width of the grooves 4 and 10 and larger than its minor diameter $d_2$. The minor diameter $d_2$ of the cam follower 20 is smaller than the width of the grooves 4 and 10.

The spiral groove 4 includes an inner wall 22, an outer wall 24 and a bottom wall 26 which form a rectangular shape as shown in FIGS. 2 and 3. Likewise, the return slot 10 includes an inner wall 27, an outer wall 28 and a bottom wall 29 which forms a rectangular shape. Outer wall 24 of the spiral groove 4 meets outer wall 28 of the return slot 10. Likewise, inner wall 22 of the spiral groove 4 meets inner wall 27 of the return slot 10, and bottom wall 26 of the spiral groove 4 meets bottom wall 29 of the return slot 10. Bottom wall 26 of the spiral groove 4 is located, in this embodiment of the cam 2, in the same plane as bottom wall 29 of the return slot 10.

The advantages of using the cam 2 and cam follower 20 arrangement as described herein for a tool will be explained as follows. Typically, the cam 2 is pivoted about its center 16. An arm L is pivotally attached at one end to a fixed point C beyond the cam 2 and is also pivotally attached at another end to the cam follower 20 as shown in FIG. 1. As the cam 2 is rotated about its center 16 in a counterclockwise direction, the cam follower 20 is forced along by walls 22 and 24 of the groove 4 and travels from the outermost track 6 from a first position E through the intermediate tracks 9, as shown by positions F and G, to the innermost track 8, as shown by position H. The orientation of the oblong-shaped cam follower 20 is such that its minor diameter $d_2$ is positioned between inner wall 22 and outer wall 24 of the spiral groove 4. When the follower 20 moves radially toward the center 16 of the cam 2 to the end of the innermost track 8, the orientation of the cam follower 20 is rotated approximately 90° from its orientation in the spiral groove 4, as shown by position H. The cam follower 20 is then forced along by walls 27 and 28 of the return slot 10 and travels from the innermost track 8 toward the outermost track 6 along the return slot 10, as shown by positions H and I. The orientation of the cam follower 20 is then changed to its original position E in the same manner as described above. Of course, the cam 2 can be rotated in the clockwise direction in which case the cam follower 20 travels along the spiral groove 4 from the innermost track 8 of the outermost track 6 and then through the return slot 10.

In operation, a moment is applied to the cam 2 so that it rotates about its center 16. As the cam 2 is rotated, the cam follower 20 is urged along the spiral groove 4 as previously described and shown by E–H. The cam follower 20 is forced along by its interaction with inner wall 22 and outer wall 24 of the spiral groove 4. The force applied to the cam follower 20 by inner wall 22 and outer wall 24 of the cam 2 equals approximately the moment applied to the cam 2 divided by the radial distance between the center 16 of the cam 2 to the cam follower 20. As the cam follower 20 approaches the center 16 of the cam 2, a greater force is applied to the cam follower 20 since the distance between the center 16 of the cam 2 and the cam follower 20 is decreasing while the moment applied to the cam remains constant. The force applied to the arm L is equal to the force applied to the cam follower 20, since they are pivotally connected to each other.

This cam can also be used as a mechanical replacement for machinery using hydraulics. The cam/cam follower arrangement eliminates the messy operation and excessive amount of hardware required for hydraulic machinery while delivering a high mechanical advantage.

Figure 4:
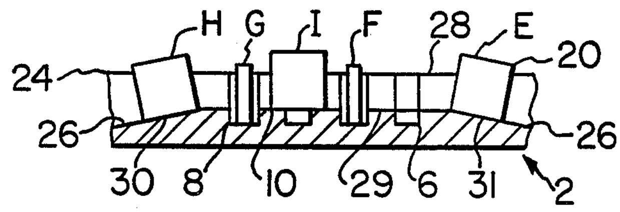
FIG. 4 is a sectional view, similar to FIG. 2, of another embodiment of a radial cam in accordance with the present invention.

In a preferred embodiment of the cam 2, shown in FIG. 4, a first geometric plane containing bottom wall 29 of the return slot 10 is positioned above a second geometric plane containing bottom wall 26 of the spiral groove 4. An entrance ramp 30 connects bottom wall 26 of the innermost track 8 of the spiral groove 4 to bottom wall 29 of the return slot 10 and an exit ramp 31 connects bottom wall 26 of the outermost track 6 of the spiral groove 4 with bottom wall 29 of the return slot 10. By having bottom wall 26 of the spiral groove 4 positioned in a plane below bottom wall 29 of the return slot 10, the likelihood that the cam follower 20 will become jammed on the corners formed by the intersection of the spiral groove 4 with the return slot 10 is minimized.

Figure 5:
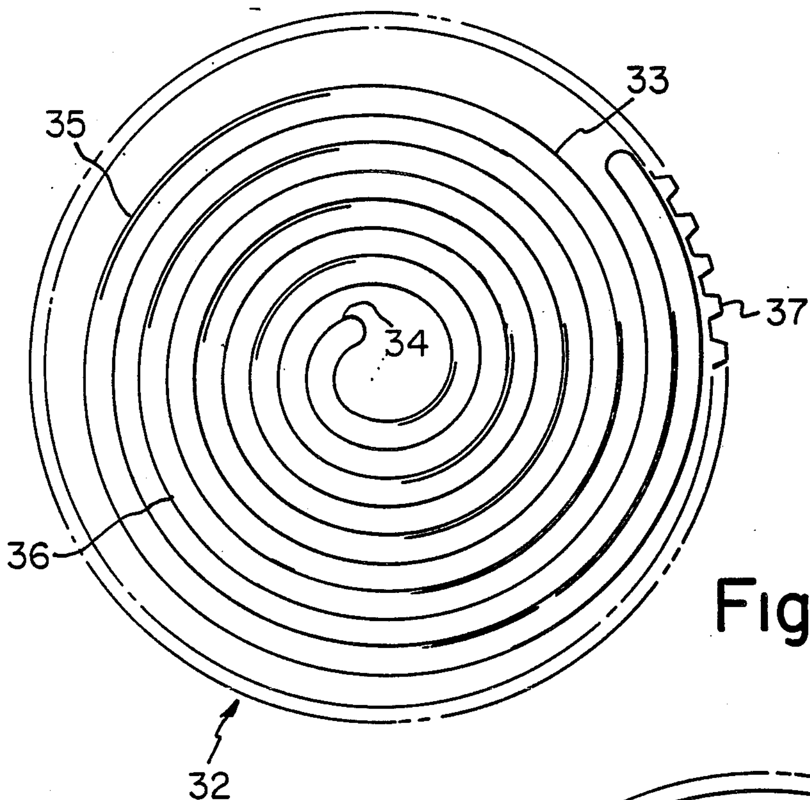
FIG. 5 is a top view of another embodiment of a radial cam in accordance with the present invention.

FIG. 5 shows an alternative embodiment of a radial cam 32 in accordance with the present invention. Cam 32 has a spiral groove 33 formed of a plurality of tracks having progressively smaller radii, including an innermost track 34, an outermost track 35, intermediate track 36 and gear teeth 37. Cam 32 is exactly the same as cam 2 shown in FIG. 1 except that cam 32 does not have a return slot.

Figure 6:
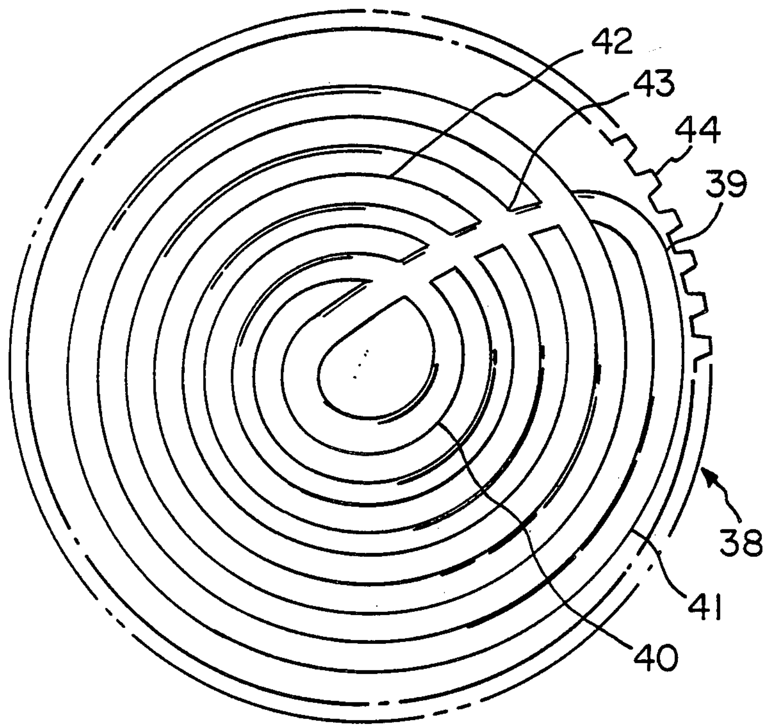
FIG. 6 is a top view of another embodiment of a radial cam in accordance with the present invention.

FIG. 6 shows an alternative embodiment of a radial cam 38 in accordance with the present invention. Cam 38 has a spiral groove 39 formed of a plurality of tracks having progressively smaller radii including an innermost track 40, an outermost track 41 and intermediate track 42 therebetween; an arcuate-shaped return slot 43 connecting the innermost track 40 to the outermost track 41 and gear teeth 44 about its outer perimeter. Cam 38 is exactly the same as cam 2 shown in FIG. 1 except that cam 38 has an arcuate-shaped return slot 43. The arcuate-shaped return slot 43 permits the cam follower to travel more smoothly therealong as compared to a straight return slot.

Figure 7:
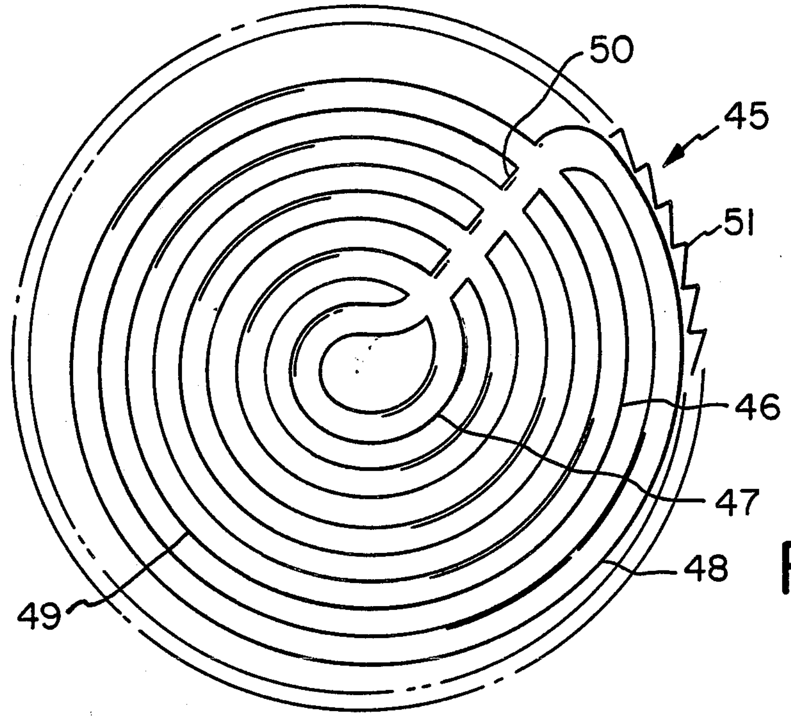
FIG. 7 is a top view of another embodiment of a radial cam in accordance with the present invention.

FIG. 7 shows an alternative embodiment of a radial cam 45 in accordance with the present invention. Cam 45 has a spiral groove 46 formed of a plurality of tracks having progressively smaller radii including an innermost track 47, an outermost track 48 and intermediate track 49 therebetween, a straight return slot 50 connecting the innermost track 47 to the outermost track 48 and pawl teeth 51 about its outer perimeter. Cam 45 is exactly the same as cam 2 except that it has pawl teeth 51 about its outer perimeter so that it may be utilized in a pawl and ratchet arrangement.

Figure 8:
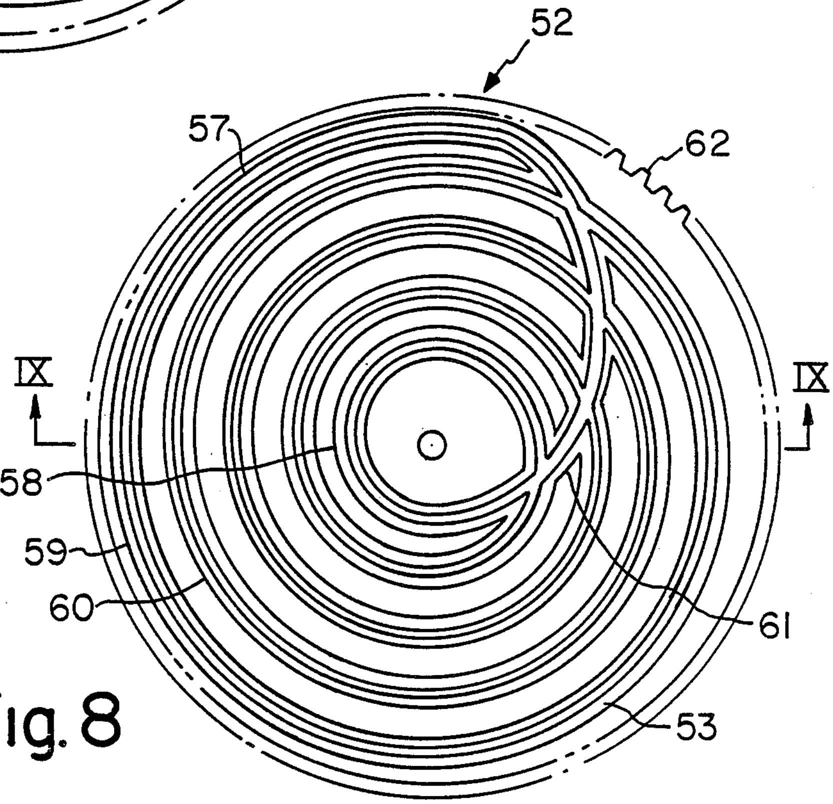
FIG. 8 is a top view of another embodiment of a radial cam in accordance with the present invention.
Figure 9:
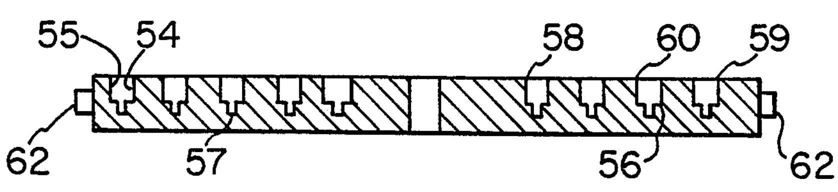
FIG. 9 is a section along lines IX—IX in FIG. 8.

FIGS. 8 and 9 show another alternative embodiment of a radial cam 52 in accordance with the present invention. Cam 52 has a spiral groove formed by a rectangular shaped primary spiral groove 53 having an inner wall 54, an outer wall 55, a bottom wall 56, and a rectangular shaped secondary spiral groove 57 depending from the bottom wall of the primary spiral groove 53. The cam 52 is also formed of a plurality of tracks having progressively smaller radii including an innermost track 58, an outermost track 59 and an intermediate track 60, an arcuate shaped return slot 61 and gear teeth 62 about its outer perimeter.

Other known gear or teeth configurations may be utilized around the outer perimeter of the cams discussed above an not depart from the scope of the present invention.

Figure 11:
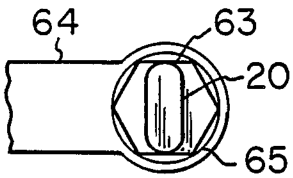
FIG. 11 is a bottom view of a portion of the cam follower and arm of FIG. 10.
Figure 10:
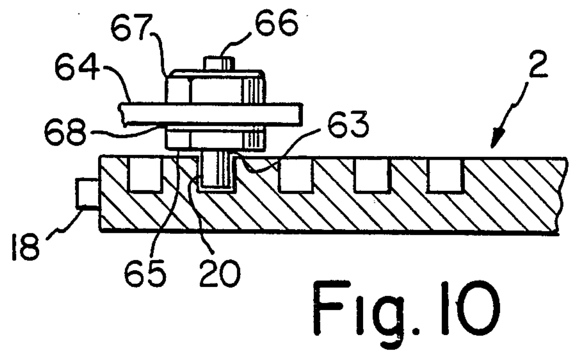
FIG. 10 is a sectional view of a portion of another embodiment of a radial cam and cam follower in accordance with the present invention.

FIGS. 10–14 show alternate embodiments of radial cams and cam followers in accordance with the present invention. FIGS. 10 and 11 show the cam 2 with a cam follower assembly 63 pivotally mounted to an arm 64. The cam follower assembly 63 includes the oblong-shaped cam follower 20, a base portion 65 and a cylindrical pin 66. The cam follower 20 depends from and is integral with the base portion 65 and the pin 66 is positioned above the base portion 65 and the cam follower 20 and is integral therewith. The pin 66 of the cam follower assembly 63 is slidably received by a bore positioned at an end of the arm 64 and passes therethrough. A fastener 67, such as a locking nut, is mounted to the pin 66 of the cam follower assembly 63 and rests upon one surface of the arm 64. A washer 68 is received by the pin 66 and is sandwiched between the base portion 65 of the cam follower assembly 63 and a surface of the arm 64 which is positioned opposite the surface upon which the fastener 67 rests.

Figure 12:
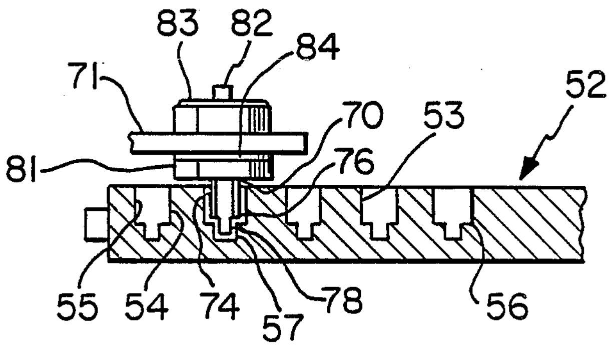
FIG. 12 is a sectional view of a portion of another embodiment of a radial cam and cam follower in accordance with the present invention.
Figure 13:
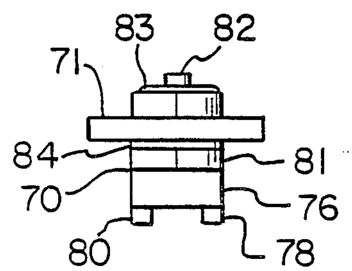
FIG. 13 is a side view of a portion of the cam follower and arm of FIG. 12.

FIGS. 12 and 13 show cam 52 with a cam follower assembly 70 received therein and pivotally mounted to an arm 71. The cam follower assembly 70 includes a cam follower 74 having a primary cam follower 76 positioned above and integral with a first secondary follower section 78 and a rearwardly positioned second secondary follower section 80. The primary cam follower 76 is slidably received by the primary spiral groove 53 and the secondary cam followers 78 and 80 are slidably received by the secondary spiral groove 57. The cam follower assembly 70 also includes a base portion 81 and a cylindrical pin 82 mounted to the arm 63 by a fastener 83 and a washer 84.

Figure 14:
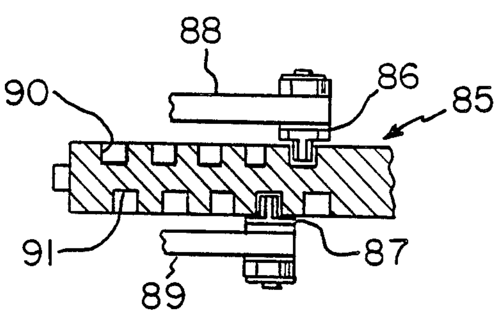
FIG. 14 is a sectional view of a portion of another embodiment of a radial cam and cam followers in accordance with the present invention.

FIG. 14 shows a cam 85 and cam follower assemblies 86 and 87 pivotally mounted to an upper arm 88 and a lower arm 89, respectively. Cam 85 is a flat, circular plate having an upper surface and a lower surface, whereby a rectangular-shaped spiral groove 90 is formed in the upper surface of the cam 85 and a rectangular-shaped spiral groove 91 is formed in the bottom surface of the cam 85. Cam follower assembly 86 is similar to cam follower assembly 63 and is pivotally mounted to upper arm 88. Likewise, cam follower assembly 87 is similar to cam follower assembly 63 and is pivotally mounted to lower arm 89.

Any of the above described cams and cam followers or features thereof may be used in conjunction with the following described embodiments of tools in accordance with my invention.

Figure 15:
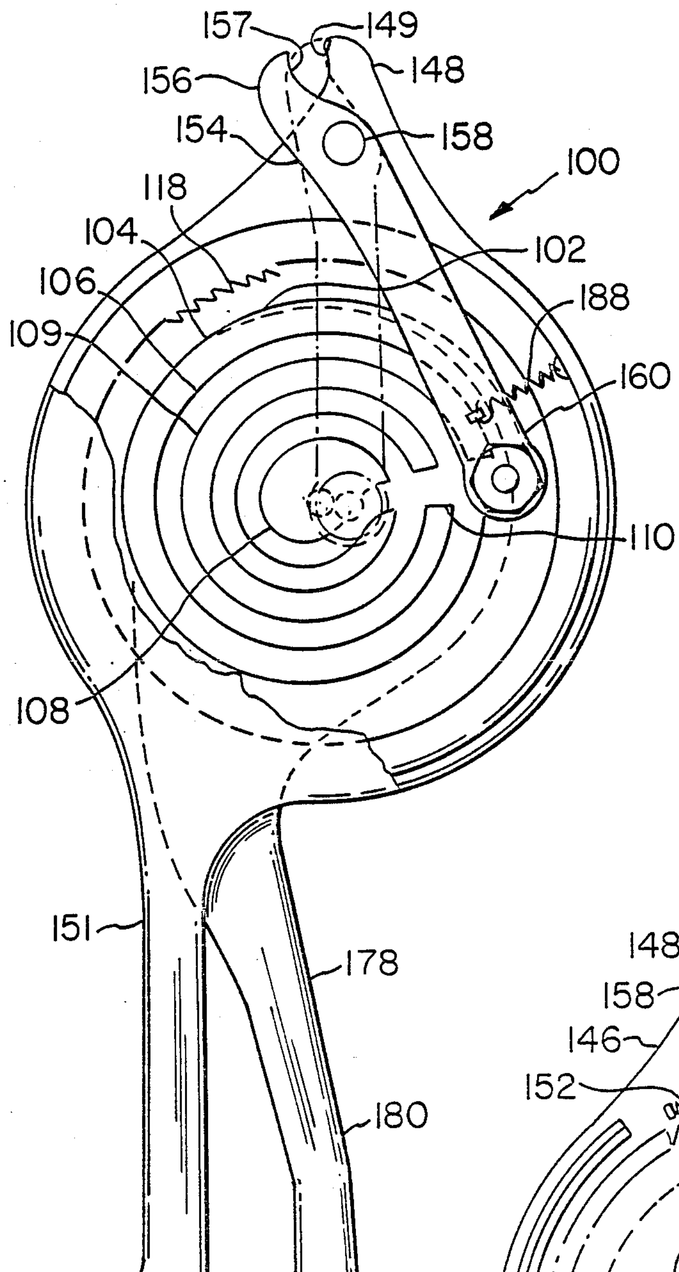
FIG. 15 is a top view, partially broken away, of a bonecutter utilizing the radial cam of the present invention.
Figure 16:
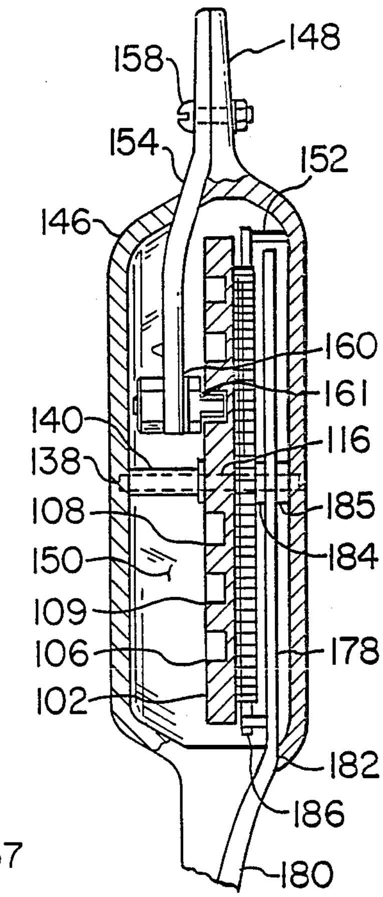
FIG. 16 is a side view, partially in section, of a portion of the bonecutter of FIG. 15.
Figure 17:
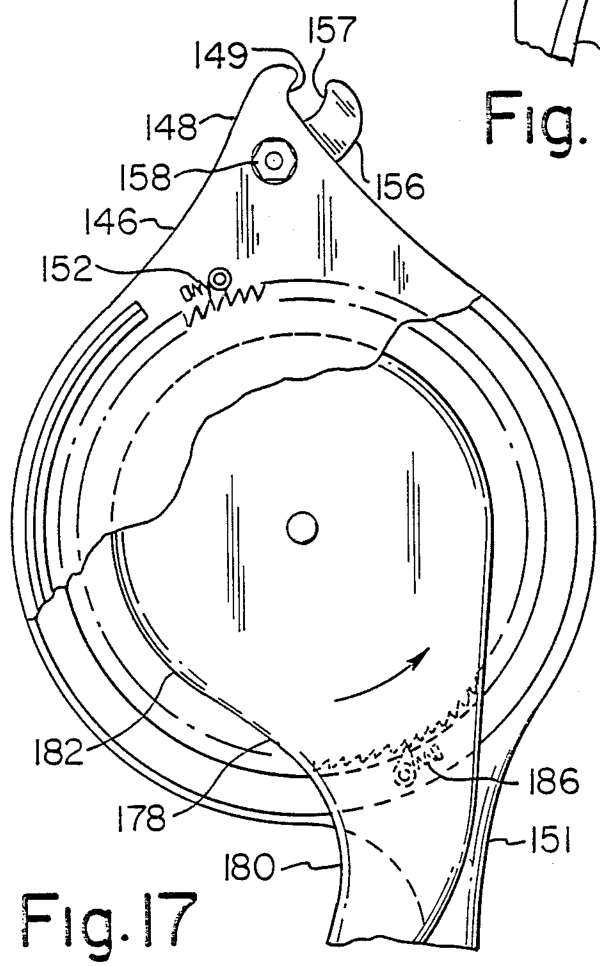
FIG. 17 is a bottom view, partially broken away, of a portion of the bonecutter of FIG. 16.

FIGS. 15–17 show a bonecutter 100 utilizing the spiral grooved cam arrangement of the present invention. The bonecutter 100 includes a circular-shaped cam 102, similar to cam 45 shown in FIG. 7, having a counterclockwise spiral groove 104 with an outermost track 106, an innermost track 108 and intermediate track 109 therebetween, and a return slot 110. The cam 102 has a center opening 116 and incorporates pawl teeth 118 about its outer perimeter. A cylindrically-shaped pivot pin 138 is received by the center opening 116 of the cam 102, preferably by a cylindrical bearing 140 press fit into the center opening 116.

The cam 102 is received in a tool body 146 which includes a cutter 148 havinq a sharp arcuate hooked cutting edge 149, a receiving chamber 150 and an elongated handle 151. The receiving chamber 150 of the tool body 146 is integral with and positioned rearward of cutter 148 and is cup-shaped so that it can receive the cam 102. A first pawl and ratchet arrangement 152 is attached to the base of the receiving chamber 150 and engages the pawl teeth 118 of the cam 102. This arrangement permits rotation of the cam 102 in only one direction, in this case in the clockwise direction. The elongated handle 151 of the tool body 146 is integral with and positioned rearward of the receiving chamber 150.

The bonecutter 100 also includes an elongated cutting arm 154 having a cutter 156 with a sharp cutting edge 157 shaped in the form of an arcuate hook which is a mirror image of cutter 148. Cutting edge 149 of cutter 148 faces and is positioned directly above cutting edge 157 of cutter 156. A pivot pin 158 is received by cutter 148 of the tool body 146 and is also received by the cutting arm 154 between the end containing cutter 156 and an end opposite thereof 160. Accordingly, the cutting arm 154 is rotatable about a longitudinal axis passing through the pivot pin 158 so that cutter 156 can move either toward cutter 148 or away therefrom. A cam follower assembly 161, which is similar to cam follower assembly 63 shown in FIGS. 10 and 11, is pivotally attached to the end 160 of the cutting arm 154.

A movable handle structure 178 is also included in the bonecutter tool 100 and has an integral elongated handle section 180 and a flat circular section 182 with a central bore therethrough. The handle section 180 of the movable handle structure 178 is similar in shape to the handle 151 of the tool body 146 and is positioned adjacent thereto. The circular section 182 has a diameter less than that of the receiving chamber 150 of the tool body 146.

A pair of spacers 184 and 185 are received by the pivot pin 138 passing through the cam 102. The first spacer 184 is positioned adjacent to and on the side opposite the spiral groove 104 of the cam 102 and rests thereon. The circular section 182 of the handle structure 178 slidably receives the pivot pin 138 of the cam 102, via the central bore, directly beneath the first spacer 184 and the second spacer 185 is positioned therebeneath. The spacers 184 and 185 form a press fit upon the pivot pin 138 of the cam 102 so that the cam 102 and the rotating handle structure 178 are held in place along an axis passing through the pivot pin 138.

A second pawl and ratchet arrangement 186 is attached to the handle structure 178 and is positioned at the intersection of the handle section 180 and circular section 182 of the movable handle structure 178. The second pawl and ratchet arrangement 186 engages with the pawl teeth 118 of the cam 102 and drives the cam 102 in the clockwise direction when the handle structure 178 is rotated in a similar direction.

A spring 188 is attached at one end to the cutting arm 154 between cutter 156 and end 160 thereof. The other end of the spring 188 is attached to the receiving chamber 150 of the tool body 146. This arrangement provides a return force to the cam follower assembly 161 so that when it reaches the innermost track 108, the cam follower assembly 161 will be moved along the return slot 110 to the outermost track 106.

In operation of the bonecutter 100, the handle section 180 of the movable handle structure 178 can be rotated a certain fixed angular distance repeatedly in the counterclockwise/clockwise direction. The second pawl and ratchet arrangement 186 will drive the cam 102 in fixed angular steps when the handle section 180 is rotated in the clockwise direction. This action rotates the cam 102 and in turn rotates the cutting arm 154 about the pivot pin 138 so that cutter 156 is rotated toward cutter 148 as the cam follower assembly 161 travels along the spiral groove 104 of the cam 102 towards a closed position as shown in phantom in FIG. 12. As the handle section 180 is rotated counterclockwise, the position of the cutter 156 is maintained by the first pawl and ratchet arrangement 152. When the ca follower assembly 161 has traveled to the innermost track 108, it then moves along the return slot 110 through the urging of the spring 188. In this manner, cutters 148 and 156 are returned to an open position with the cam follower assembly 161 at the outermost track 106. The greatest force applied by cutters 148 and 156 onto a bone is when the cam follower assembly 161 is traveling in the innermost track 108, and the least cutting force applied is when the cam follower assembly 161 is traveling in the outermost track 106 of the cam 102.

Figure 18:
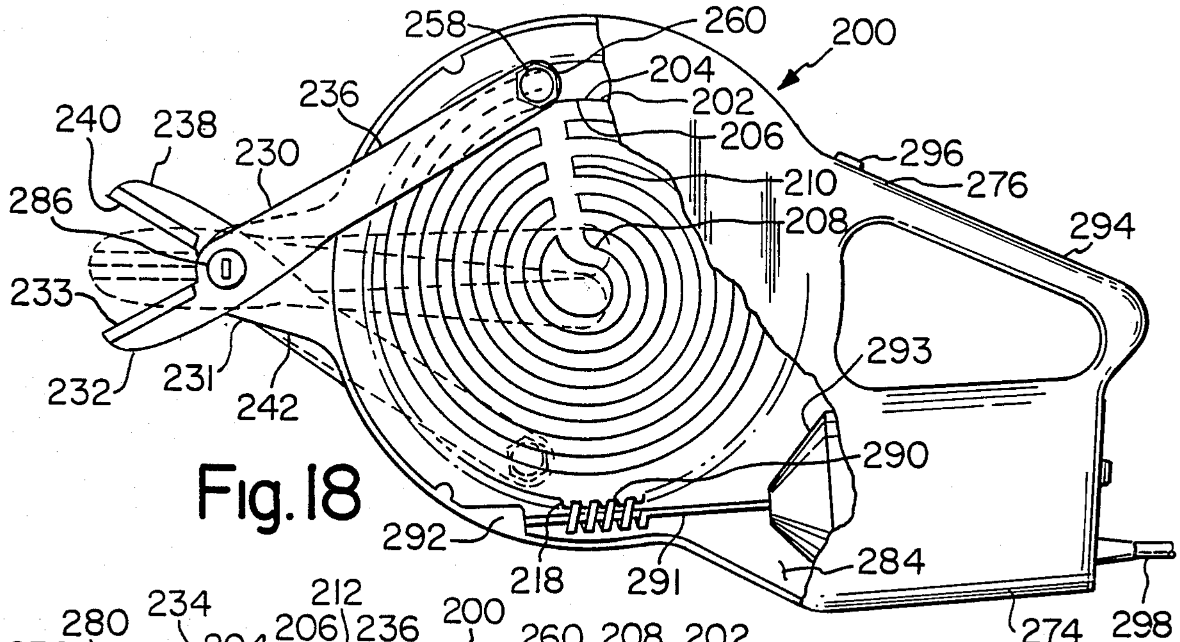
FIG. 18 is a top view, partially broken away, of a shearing tool utilizing the radial cam of the present invention.
Figure 19:
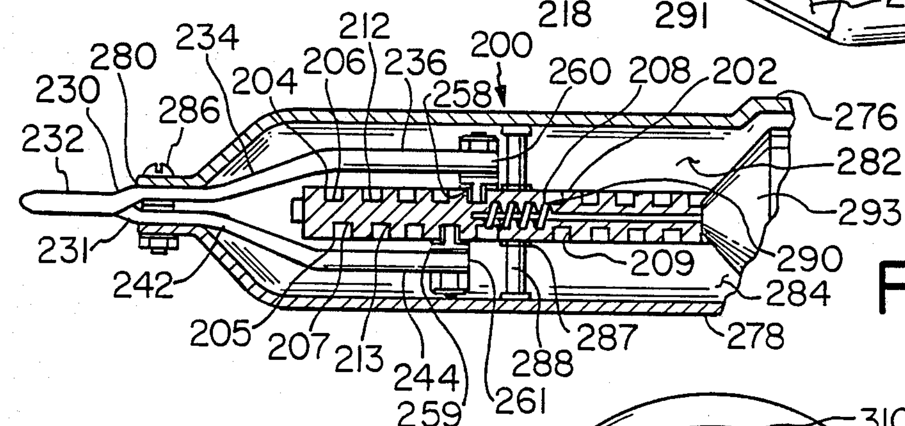
FIG. 19 is a side view, partially in section, of a portion of the shearing tool of FIG. 18.

A shearing or cutting tool 200 in accordance with the present invention is shown in FIGS. 18 and 19. The shearinq tool 200 includes a circular-shaped cam 202 having a top surface and bottom surface. The cam 202 is similar to cam 85 shown in FIG. 14 above and includes a clockwise spiral groove 204 having an outermost track 206, an innermost track 208 and intermediate tracks 212 therebetween and a return slot 210 integrally formed on its top surface. The cam 200 also includes a counterclockwise spiral groove 205 having an outermost track 207, an innermost track 209 and intermediate tracks 213 therebetween and a return slot (not visible) integrally formed on its bottom surface. The cam 202 has a center bore and incorporates worm gear teeth 218 about its outer perimeter.

The shearing tool 200 includes a pair of elongated cutting arms 230 and 231. Cutting arm 230 is positioned adjacent to and above the cam 202 and has a flat straight cutter section 232 with a cutting edge 233. Cutter section 232 is integrally connected at one end to an upwardly sloping middle section 234 which is integrally connected to a flat top section 236 that is positioned opposite cutter section 232. Likewise, cutting arm 231 is positioned adjacent to and below the cam 202 and has a flat straight cutter section 238 with a cutting edge 240. Cutter section 238 is integrally connected at one end to a downwardly sloping middle section 242 and a flat top section 244 is integrally connected to middle section 242 and is positioned opposite cutter section 238.

A cam follower assembly 258, similar to cam follower assembly 63 shown in FIGS. 10 and 11, is pivotally attached to an end 260 of flat top section 236 of cutting arm 230. A similar cam follower assembly 259 is pivotally attached to an end 261 of top section 244 of cutting arm 231.

The cam 202 and cutting arms 230 and 231 are received in a body 274 that includes a first section 276 and a second section 278 joined together, a frontal opening 280, a cam chamber 282 and a motor chamber 284. The cam 202 is received in the cam chamber 282 with the cutting arms 230 and 231 criss-crossing each other and extending outwardly from the frontal opening 280 and with cutting edges 233 and 240 of cutting arms 230 and 231 facing each other. A fastener assembly 286 passes through the first section 276 and second section 278 of the body 274 near the frontal opening 280. The fastener assembly 286 also passes through cutting arms 230 and 231, which are sandwiched between the first section 276 and second section 278 of the body 274 rearwardly adjacent to cutting edges 233 and 240, respectively, and permits pivotal movement of the cutting arms 230 and 231 about a longitudinal axis passing through the fastener assembly 286. A bearing 287 is positioned in the center bore of the cam 202 and receives a pivot pin 288 which passes therethrough. The pivot pin 288 is attached to the body 274 of the shearing tool 200, so that the cam 202 can rotate thereabout.

A worm 290 is engaged with the worm gear teeth 218 of the cam 202. A shaft 291 is received by the worm 290 and has on end pivotally received by the body 274 at a shoulder 292. The other end of the shaft 292 is driven by a motor 293 which is received in the motor chamber 284 of the body 274 located rearwardly of the cam chamber 282.

The shearing tool body 274 also includes a handle 294 integral therewith and positioned rearwardly of the frontal opening 280. A control switch 296 is attached to the body 274 adjacent the handle 294 and is electrically connected to the motor 293 and to an electrical power line 298 passing into the body 274.

In operation, when the control switch 296 is moved into an on position, the motor 293 is energized and rotates the shaft 292, which in turn rotates the worm 290. The worm 290 rotates the cam 202 and causes cam follower assemblies 258 and 259 to travel along their respective spiral grooves 204 and 205. Accordingly, both cutting arms 230 and 231 are rotated about the longitudinal axis passing through the fastener assembly 286. As cam followers 258 and 259 travel toward the center of the cam 202, cutting edges 233 and 240 move toward each other and eventually reach a closed position, shown in phantom in FIG. 18. When the cam follower assemblies 258 and 259 have reached innermost tracks 208 and 209, they will then travel along return slots 210 and 211 of the cam 202 to outermost tracks 206 and 207. As a result, cutting edges 233 and 240 will move apart from each other to an open position, shown in FIG. 18. In this manner, a motor traveling in one direction can operate the shearing tool 200. When the cutting operation has ended, the control switch 296 is turned to an off position.

Figure 20:
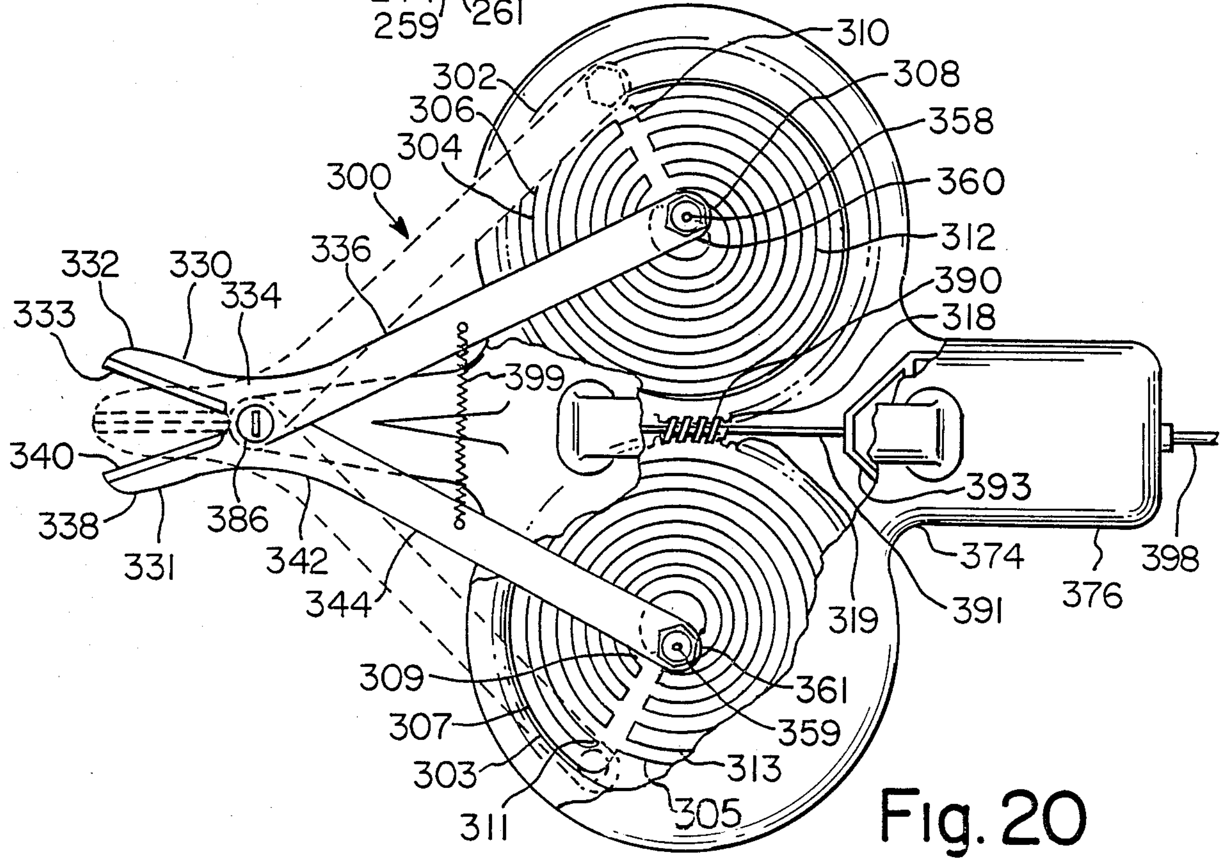
FIG. 20 is a top view, partially broken away, of a shearing tool utilizing two radial cams of the present invention.
Figure 21:
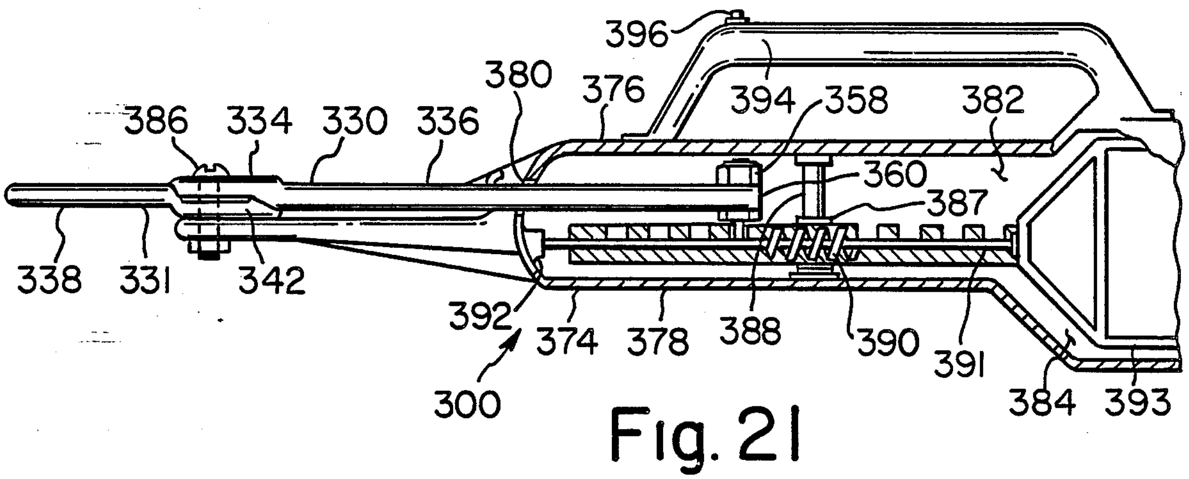
FIG. 21 is a side view, partially in section, of a portion of the shearing tool of FIG. 20.

Another embodiment of a shearing or cutting tool 300 in accordance with the present invention is shown in FIGS. 20 and 21. The shearing tool 300 includes a first circular-shaped cam 302 and a second circular-shaped cam 303, similar to cam 2 shown in FIG. 1, which are positioned sidewardly adjacent to each other and in the same plane. A counterclockwise spiral groove 304 having an outermost track 306, an innermost track 308 and intermediate tracks 312 therebetween and a return slot 310 are integrally formed on a top surface of cam 302. A clockwise spiral groove 305 having an outermost track 307, an innermost track 309 and intermediate tracks 313 therebetween and a return slot 311 are integrally formed upon a top surface of cam 303. Cam 302 has a center bore and incorporates worm gear teeth 318 about its outer perimeter and cam 303 has a center bore and incorporates worm gear teeth 319 about its outer perimeter.

The shearing tool 300 includes a pair of elongated cutting arms 330 and 331. Cutting arm 330 is positioned adjacent to and above the cam 302 and has a flat straight cutter section 332 with a cutting edge 333, an upwardly positioned middle section 334 integrally connected to cutter section 332 and a flat section 336 integrally connected to middle section 334 and positioned opposite of and in the same plane as cutter section 332. An obtuse angle is formed at the intersection of longitudinal lines passing through cutter section 332 and flat section 336 of cutting arm 330. Likewise, cutting arm 331 is positioned adjacent to and above cam 303 and has a flat straight cutter section 338 with a cutting edge 340, a downwardly positioned middle section 342 integrally connected at one end to cutter section 338 and a flat section 344 integrally connected to middle section 342 positioned opposite of and in the same plane as cutter section 338. An obtuse angle is formed at the intersection of longitudinal lines passing through cutter section 338 and flat section 344.

A cam follower assembly 358, which is similar to cam follower assembly 63 shown in FIGS. 10 and is pivotally attached to an end 360 of flat section 336 of cutting arm 330. Likewise, a cam follower assembly 359, which is similar to cam follower assembly 358, is pivotally attached to an end 361 of flat section 344 of cutting arm 331.

Cams 302 and 303 and cutting arms 330 and 331 are received in a body 374 which includes a first section 376 and a second section 378 joined together, a frontal opening 380, a cam chamber 382 and a motor chamber 384. Cams 302 and 303 are received by the cam chamber 382 and the cutting arms 330 and 331 extend forwardly from the frontal opening 380 with cutting edges 333 and 340 of cutting arms 330 and 331 facing each other. A fastener assembly 386 passes through the first section 376 and the second section 378 of the body 374 near the frontal opening 380. The fastener assembly 386 also passes through middle sections 334 and 342 of cutting arms 330 and 331, which are sandwiched between the first section 376 and the second section 378 of the body 374, where middle section 334 of cutting arm 330 is positioned directly above middle section 342 of cutting arm 331. The fastener assembly 386 permits movement of the cutting arms 330 and 331 about a longitudinal axis passing through the fastener assembly 386.

A bearing 387 is positioned in the center opening of cam 302 and receives a pivot pin 388 which passes therethrough. The pivot pin 388 is attached to the body 34 of the shearing tool 300, so that cam 302 can rotate about the pivot pin 388. Although not shown, a similar arrangement is used to pivotally attach cam 303 to the body 374. A worm 390 is positioned between cams 302 and 303 and engages the gear teeth 318 and 319 of cams 302 and 303, respectively. A shaft 391 is attached to the worm 390 and one end of the shaft 391 is pivotally received by the body 374 at a shoulder 392 and the other end of the shaft 391 is driven by a motor 393. The motor 393 is received in the motor chamber 384 of the body 374 which is located rearward of the cam chamber 382.

The shearing tool body 374 includes an integral handle 394 that is positioned above the worm 391 and rearwardly of the frontal opening 380. A control switch 396 is electrically connected in series to the motor 393 and an electrical power line 398 passes through the body 374.

A spring 399 is connected to cutting arms 330 and 331 positioned intermediately along the lengths of flat sections 336 and 344, respectively. This arrangement provides a return force to cam follower assemblies 358 and 359 when they reach their respective outermost tracks 306 and 307, so that they can be urged along return slots 310 and 311 to innermost tracks 308 and 309, respectively.

In operation, when the control switch 396 is moved into an on position, the motor 393 is energized and rotates the shaft 392, which in turn rotates the worm 391 causing cam 302 to rotate in the counterclockwise direction and cam 303 to rotate in the clockwise direction. Cam follower assemblies 358 and 359 travel along spiral grooves 304 and 305 of cams 302 and 303 from their respective innermost tracks 308 and 309 to outermost tracks 306 and 307. Cutter sections 332 and 338, which are initially in an open position when cam follower assemblies 358 and 359 are in innermost tracks 308 and 309, move toward each other to a closed position as cam follower assemblies 358 and 359 move along spiral grooves 304 and 305 toward outermost tracks 306 and 307, respectively, as shown in phantom in FIG. 20. When cam follower assemblies 358 and 359 reach their respective outermost tracks 306 and 307, they are pulled along return slots 310 and 311 to innermost tracks 308 and 309, respectively, by the spring 399.

The cutting tools 100, 200 and 300 can also be part of a stationary machine as opposed to hand held units as shown. Furthermore, the cutting edge of these tools could be replaced by various fixtures so that the tools can be used as presses or clamps.

Figure 22:
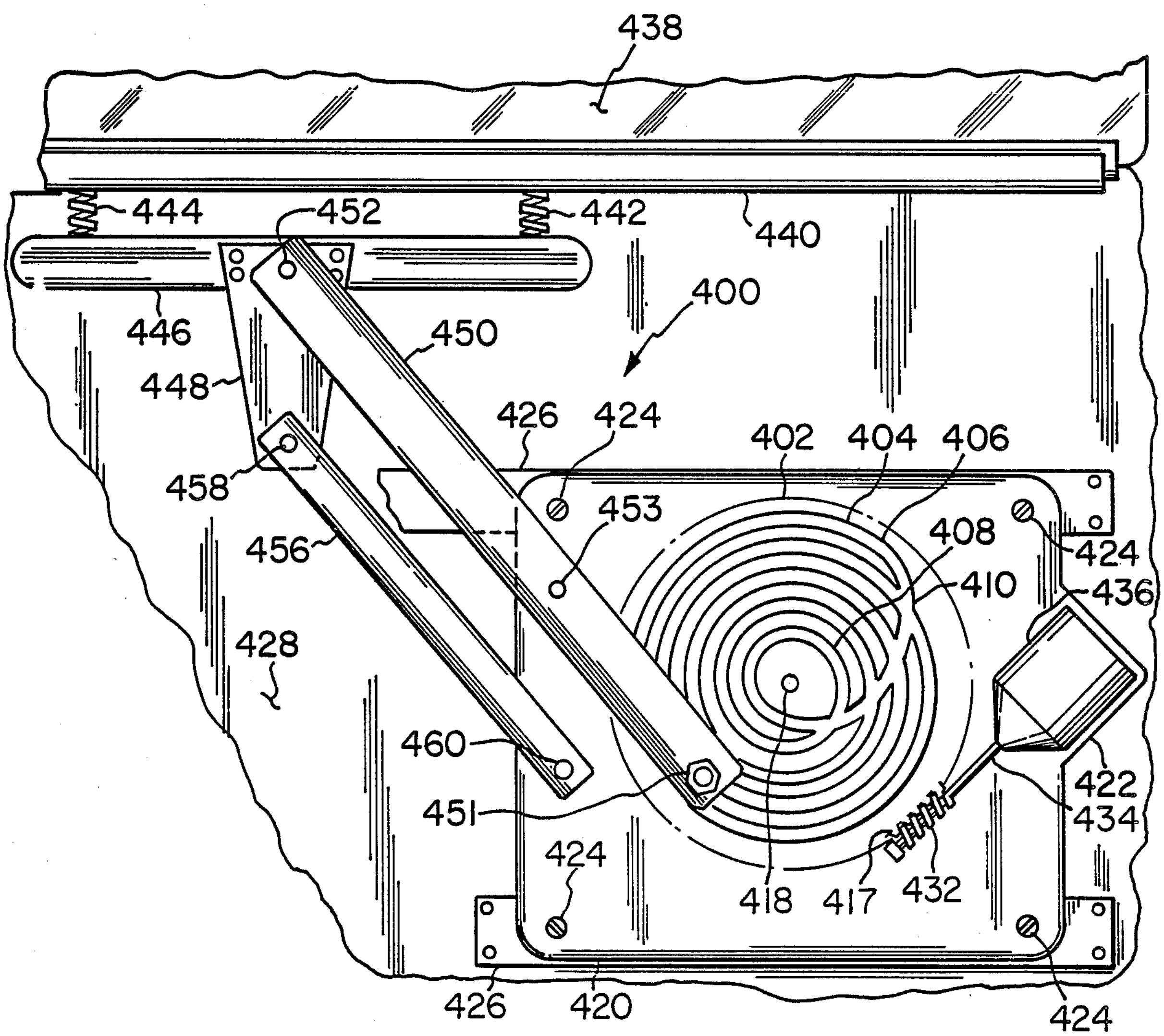
FIG. 22 is a side view of a device for raising and lowering utilizing a radial cam of the present invention.

A device for raising and lowering 400 using the radial cam of the present invention is shown in FIG. 22. The device for raising and lowering 400 is shown in FIG. 22 being used in conjunction with a window on a guide track and includes a circular cam 402, similar to cam 52 shown in FIGS. 8 and 9. The cam 402 includes a counterclockwise spiral groove 404 having an outermost track 406 and an innermost track 408, an arcuate shaped return slot 410, a center bore and worm gear teeth 417 about the perimeter of the cam 402. The arcuate shaped return slot permits a scissor-like action i.e. a slow opening movement and smooth quick closing movement of the window as opposed to the snap action closing movement of the previously described cutting tools which have straight slots. The cam 402 is pivotally mounted by a pivot pin 418 passing through the center bore of the cam 402 and attached to a mounting plate 420.

The mounting plate 420 is essentially square shaped, with the addition of a motor mounting extension 422 that depends from one side of the mounting plate 420. The mounting plate 420 is attached by fasteners 424, such as screws, to support brackets 426 which are, in turn, mounted to a window holding structure 428, such as the interior of an automobile door.

A worm 432 is engaged with the gear teeth 417 of the cam 402. A shaft 434 is attached at one of its ends to the worm 432 and the other end of the shaft 434 is driven by a motor 436. The motor 436 is mounted to the motor mounting extension 422 of the mounting plate 420 and is electrically activated in a manner well known in the art.

The window on the guide track includes a glass plate 438 mounted at its base to a channel 440 and received in a guide track (not shown). Two expansion springs 442 and 444 are provided each having one end mounted to the channel 440 and their other ends mounted to a mounting bracket 446. A trapezoid-shaped attachment member or raising and lowering member 448 has its wider base attached to the mounting bracket 446 and is positioned centrally between expansion springs 442 and 444.

A driving arm 450 has one end pivotally mounted by a pivot pin 452 near the wider base of the attachment member 448. The other end of the driving arm 450 is pivotally mounted to a cam follower assembly 451 similar to the cam follower assembly 70 shown in FIGS. 12 and 13. A fulcrum or pivot pin 453 is attached to the mounting plate 420 and is received by the driving arm 450 intermediate its ends so that the driving arm 450 cam rotates about an axis parallel to the axis passing through the center of the cam 402. The cam follower assembly 451 is slidably received by the continuous groove of the cam 402. A guiding arm 456, which is shorter than the driving arm 450, has one end pivotally mounted by a pin 458 near the narrower base of the attachment member 448. The other end of the guiding arm 456 is pivotally attached to the mounting plate 420 by a pin 460, opposite the motor extension 422.

In operation the motor 436 is activated and drives the worm 432, thereby rotating the cam 402 in the counterclockwise direction. This causes the driving arm 450 to move from the innermost track 408 to the outermost track 406, which in turn causes the window to move in the downward direction with the assistance of the guiding arm 456 and the window guide track. The extension springs 442 and 444 either are expanded or contracted in the lateral direction to compensate for the displacement of the driving arm 450 and the guiding arm 456 in the radial direction.

When the cam follower assembly 451 reaches the outermost track 406, the window is at its lowermost position. If the cam 402 is rotated further, the cam follower 451 travels along the return slot 410 and is positioned at the innermost track 408 with the window at its uppermost position.

This cam 402 and driving arm 450 arrangement can be used with other machines where it is required to raise and lower an object. One example of this is a car jack.

Having described the presently preferred embodiments of my invention, it is to be understood that it may otherwise be embodied within the scope of the appended claims.

I claim:

1. A cam comprising a flat plate having at least a first flat surface and having a spiral groove in the first flat surface, the spiral groove formed of a plurality of tracks having progressively smaller radii and including at least an innermost track and an outermost track, the cam further including a return slot connecting the innermost track to the outermost track, with the tracks and return slot forming a continuous groove on the first flat surface.

2. The cam of claim 1 wherein the return slot extends along a straight path between the innermost track and the outermost track.

3. The cam of claim 1 wherein the return slot extends along an arcuate path between the innermost track and the outermost track.

4. The cam of claim 1 wherein the continuous groove is rectangularly shaped.

5. The cam of claim 1 wherein the continuous groove has a bottom wall and an additional groove is formed along the bottom wall of the continuous groove.

6. The cam of claim 1 wherein the flat plate is circular and has teeth around a peripheral edge.

7. The cam of claim 1 wherein the spiral groove has a bottom wall and the return slot has a bottom wall and the bottom wall of the spiral groove is in a different geometric plane than the bottom wall of the return slot.

8. The cam of claim 7 further including a first ramp connecting the bottom wall of the innermost track of the spiral groove to a first end of the bottom wall of the return slot and a second ramp connecting the bottom wall of the outermost track of the spiral groove to a second end of the bottom wall of the return slot.

9. The cam of claim 1 further including one or more intermediate tracks positioned between the outermost track and the innermost track.

10. The cam of claim 1 wherein the return slot passes through at least one track.

11. The cam of claim 1 wherein the flat plate has a second flat surface having a spiral groove therein, the spiral groove formed of a plurality of tracks having progressively smaller radii and including at least an innermost track and an outermost track, the cam further including a return slot connecting the innermost track to the outermost track, with the track and return slot forming a continuous groove on the second flat surface.

12. A mechanical advantage device comprising:

A. a base;

B. a cam pivotally mounted to the base and including a flat plate having at least a first flat surface and having a spiral groove in the first flat surface, the spiral groove formed of a plurality of tracks having progressively smaller radii and including at least an innermost track and an outermost track, the cam further including a return slot connecting the innermost track to the outermost track, with the tracks and return slot forming a continuous groove on the first flat surface;

C. a cam follower slidably received in the continuous groove;

D. a lever arm having one end pivotally attached to the cam follower and also pivotally attached to the base intermediate of its ends; and E. means for rotating the cam in the plane of said flat surface.

13. The mechanical advantage device of claim 12 wherein the return slot of the cam extends along a straight path between the innermost track and the outermost track.

14. The mechanical advantage device of claim 12 wherein the return slot of the cam extends along an arcuate path between the innermost track and the outermost track.

15. The mechanical advantage device of claim 12 wherein the continuous groove of the cam has a bottom wall and an additional secondary groove is formed along the bottom wall of the continuous groove.

16. The mechanical advantage device of claim 12 wherein the flat plate of the cam is circular and has teeth around a peripheral edge.

17. The mechanical advantage device of claim 12 wherein the spiral groove of the cam has a bottom wall and the return slot has a bottom wall and the bottom wall of the spiral groove is in a different geometric plane than the bottom wall of the return slot; the cam further includes a first ramp connecting the bottom wall of the innermost track of the spiral groove to a first end of the bottom wall of the return slot and a second ramp connecting the bottom wall of the outermost track of the spiral groove to a second end of the bottom wall of the return slot.

18. The mechanical advantage device of claim 12 where the cam further includes one or more intermediate tracks positioned between the outermost track and the innermost track.

19. The mechanical advantage device of claim 12 wherein the flat plate has a second flat surface having a spiral groove therein, the spiral groove formed of a plurality of tracks having progressively smaller radii and including at least an innermost track and an outermost track, the cam further including a return slot connecting the innermost track to the outermost track, with the tracks and return slot forming a continuous groove on the second flat surface and the mechanical advantage device further including a second cam follower slidably received in the continuous groove on the second surface of the flat plate and a second lever arm having one end pivotally attached to the cam follower and attached to the base intermediate its ends.

20. The mechanical advantage device of claim 12 further including means for applying a rotational torque to the lever arm so that the cam follower is urged through the return slot.

21. The mechanical advantage device of claim 20 wherein the means for applying a rotational torque includes a spring having one end attached to the base and its other end attached to the lever arm.

22. The mechanical advantage device of claim 16 wherein the means for rotating the cam include a gear engaged with the teeth of the cam.

23. The mechanical advantage device of claim 12 wherein the cam has pawl teeth about the peripheral edge of the cam wherein the means to rotate the cam includes:

A. a first pawl and ratchet assembly attached to the base, the first pawl and ratchet assembly having a first pawl attached thereto and engaged with the pawl teeth of the cam so that the cam can rotate in only a first direction;

B. an arm pivotally mounted to the base so that it can rotate about the axis passing therethrough; and C. a second pawl and ratchet assembly attached to the arm, the second pawl and ratchet assembly having a second pawl attached thereto and engaged with the pawl teeth of the cam so that the second pawl drives the cam in the first direction when the arm is rotated in the first direction.

24. The mechanical advantage device of claim 12 wherein the cam follower is oblong shaped having a major diameter larger than a minor diameter where the cam follower is slidably received about its minor diameter within the continuous groove of the cam.

25. The mechanical advantage device of claim 24 wherein the major diameter of the cam follower is at least two times greater than its minor diameter.

26. The mechanical advantage device of claim 15 wherein the cam follower has a primary section slidably received by the continuous groove and a secondary section slidably received by the secondary groove.

27. The mechanical advantage device of claim 26 wherein the secondary section of the cam follower has a separate forward section and rearward section 28. A tool comprising:

A. a body;

B. a cam pivotally mounted to the body including a flat plate having at least a first flat surface and having a spiral groove in the first flat surface, the spiral groove formed of a plurality of tracks having progressively smaller radii and including at least an innermost track and an outermost track, the cam further including a return slot connecting the innermost track to the outermost track, with the tracks and return slot forming a continuous groove on the first flat surface;

C. means for rotating the cam so that the cam rotates about an axis passing through the cam centrally positioned with respect to the spiral groove;

D. a cam follower slidably received in the continuous groove of the cam; and

E. a first arm having two ends, one end pivotally mounted to the cam follower, the first arm being pivotally attached to the body intermediate its two ends so that the arm can rotate about an axis parallel to the axis passing through the cam.

29. The tool of claim 28 wherein the first arm has a cutting edge.

30. The tool of claim 29 further including:

a second arm attached to the body the second arm having a cutting edge facing the cutting edge of the first arm.

31. The tool of claim 30 wherein the cutting edge of the first arm is concave shaped and the cutting edge of the second arm is concave shaped.

32. The tool of claim 28 wherein the cam is circular in shape and has pawl teeth about a peripheral edge and further includes a first handle attached to the body and a second handle pivotally attached to the cam and the means to rotate the cam include a first pawl and ratchet assembly attached to the body, the first pawl and ratchet assembly having a first pawl attached thereto and engaged with the pawl teeth of the cam so that the cam rotates in only a first direction; and a second pawl and ratchet assembly attached to the second handle, the second pawl and ratchet assembly having a second pawl attached thereto and engaged with the pawl teeth of the cam so that the second pawl drives the cam in the first direction when the second handle is rotated in the first direction.

33. A tool comprising:

A. a body;

B. a cam pivotally mounted to the body and having a circular flat plate having at least a first flat surface and having a spiral groove in the first flat surface, the spiral groove formed of a plurality of tracks having progressively smaller radii and including at least an innermost track and an outermost track, the cam further including a return slot connecting the innermost track to the outermost track, with the track and return slot forming a continuous groove on the first flat surface, the cam also having pawl teeth about its peripheral edge;

C. a cam follower slidably received in the continuous groove of the cam, the cam follower having a major diameter and a minor diameter, the major diameter being greater than the minor diameter, the cam follower slidably received about its minor diameter by the continuous groove of the cam;

D. a first cutting arm having two ends, one end of the first cutting arm having a cutting edge and the other end being pivotally mounted to the cam follower, and the first cutting arm being pivotally attached to the body intermediate the cutter and the other end of the first cutting arm so that the first cutting arm can rotate about an axis parallel to the axis passing through the center of the cam;

E. means for applying a rotational torque to the first cutting arm about the axis parallel to the axis passing through the center of the cam;

F. a second cutting arm attached to the body having a cutting edge facing the cutting edge of the first cutting arm;

G. a first handle attached to the body;

H. a second handle attached to the cam;

I. a first pawl and ratchet assembly attached to the body, the first pawl and ratchet assembly having a first pawl attached thereto and engaged with the pawl teeth of the cam so that the cam can rotate in only a first direction; and J. a second pawl and ratchet assembly attached to the second handle, the second pawl and ratchet assembly having a second pawl attached thereto and engaged with the pawl teeth of the cam so that the second pawl drives the cam in the first direction when the second handle is rotated in the first direction.

34. A tool comprising:

A. a body;

B. a cam pivotally mounted to the body and having a first flat surface and a substantially parallel second flat surface, the first flat surface having a spiral groove formed of a plurality of tracks having progressively smaller radii and including at least an innermost track and an outermost track, and the first surface further including a return slot connecting the innermost track to the outermost track, with the tracks and return slot forming a continuous groove on the first flat surface, and the second flat surface having a spiral groove formed of a plurality of tracks having progressively smaller radii and including at least an innermost track and an outermost track, and the second surface further including a return slot connecting the innermost track to the outermost track, with the tracks and the return slot forming a continuous groove on the second flat surface;

C. means for rotating the cam so that the cam rotates about an axis passing through the cam centrally positioned with respect to the first surface spiral groove and second surface spiral groove;

D. a first cam follower slidably received by the first surface continuous groove;

E. a second cam follower slidably received by the second surface continuous groove;

F. a first arm having two ends, with one end pivotally mounted to the first cam follower, the first arm pivotally mounted to the body intermediate its two ends so that the first arm can rotate about an axis parallel to the axis passing through the cam; and G. a second arm having two ends, with one end pivotally mounted to &:he second cam follower and the second arm pivotally mounted to the body intermediate its two ends so that the second arm can rotate about an axis parallel to the axis passing through the cam.

35. The tool of claim 34 wherein the first arm has a cutting edge located at its other end and the second arm has a cutting edge located at its other end.

36. The tool of claim 35 wherein the first arm at an intermediate section between its ends criss-crosses the second arm at an intermediate section between its ends, and the first arm intermediate section and the second arm intermediate section are pivotally mounted to the body.

37. The tool of claim 34 wherein the cam is circular shaped and has gear teeth about a peripheral edge and the means to rotate the cam include a gear pivotally attached to the body and engaged with the gear teeth of the cam.

38. A cutting tool comprising:

A. a body having a frontal opening, a cam chamber, a motor chamber and a handle;

B. a circular cam pivotally mounted to the cam chamber having gear teeth about a peripheral edge and having a first flat surface and a substantially parallel second flat surface pivotally mounted to the body, the first flat surface having a spiral groove formed of a plurality of tracks having progressively smaller radii and including at least an innermost track and an outermost track, and the first surface further including a return slot connecting the innermost track to the outermost track, with the tracks and return slot forming a continuous groove on the first flat surface, and the second flat surface having a spiral groove formed of a plurality of tracks having progressively smaller radii and including at least an innermost track and an outermost track, and the second flat surface further including a return slot connecting the innermost track to the outermost track, with the track and the return slot forming a continuous groove on the second flat surface;

C. a first cam follower slidably received by the first surface continuous groove;

D. a second cam follower slidably received by the second surface continuous groove;

E. a first cutting arm having two ends and an intermediate section, one end of the first cutting arm having a first cutter with a cutting edge and the other end of the first cutting arm pivotally mounted to the first cam follower;

F. a second cutting arm having two ends and an intermediate section, one end of the second cutting arm having a second cutter with a cutting edge and the other end of the second cutting arm pivotally mounted to the second cam follower, the second cutting arm intermediate section criss-crossing the first cutting arm intermediate section and the first cutting arm intermediate section and second cutting arm intermediate section being pivotally mounted to the body so that the cutting edge of the first cutting arm faces the cutting edge of the second cutting arm and both cutting edges extend outwardly from the frontal opening of the body;

G. a gear pivotally attached to the body and engaged with the gear teeth of the cam; and H. a motor received in the motor receiving chamber of the body and connected to the gear.

39. A tool comprising:

A. a body;

B. a first cam pivotally attached to the body comprising a flat plate having at least a first flat surface and having a spiral groove in the first flat surface, the spiral groove formed of a plurality of tracks having progressively smaller radii and including at least a first innermost track and a first outermost track, the first cam further including a first return slot connecting the first innermost track to the first outermost track, with the tracks and first return slot forming a first continuous groove on the first flat surface;

C. a second cam pivotally attached to the body comprising a flat plate having at least a first flat surface and having a second spiral groove in the first flat surface, the second spiral groove formed of a plurality of tracks having progressively smaller radii and including at least a second innermost track and a second outermost track, the second cam further including a second return slot connecting the second innermost track to the second outermost track, with the tracks and the second return slot forming a second continuous groove on the first flat surface;

D. means for rotating the first cam and the second cam so that the first cam rotates about an axis passing therethrough centrally positioned with respect to the first spiral groove and the second cam rotates about an axis passing therethrough centrally positioned with respect to the second spiral groove;

E. a first cam follower slidably received by the first continuous groove;

F. a second cam follower slidably received by the second continuous groove;

G. a first arm having two ends, one end of the first arm pivotally mounted to the first cam follower, and pivotally mounted to the body intermediate its ends so that the first arm can rotate about an axis parallel to the axis passing through the center of the first cam; and H. a second arm having two ends, one end pivotally mounted to the second cam follower, and pivotally mounted to the body intermediate its ends so that the second arm can rotate about an axis parallel to the axis passing through the center of the second cam.

40. The tool of claim 39 wherein the first arm has a cutting edge facing a cutting edge of the second arm.

41. The tool of claim 39 wherein the first cam and second cam are adjacent to one another and are located in a same geometric plane.

42. The tool of claim 39 wherein the first cam is circular shaped and has gear teeth about a peripheral edge and the second cam is circular shaped and has gear teeth about a peripheral edge and the means for rotating the cams include a gear pivotally attached to the body and engaged with the gear teeth of the first cam and the second cam.

43. The tool of claim 39 wherein the first arm has an intermediate section positioned between its ends and the second arm has an intermediate section positioned between its ends and the first arm and the second arm are pivotally connected to one another at their respective intermediate sections and to the body at their respective intermediate sections.

44. A tool comprising:

A. a body having a frontal opening, a cam chamber, a motor chamber and a handle;

B. a first cam pivotally mounted in the cam chamber comprising a circular flat plate having gear teeth about a peripheral edge and having at least a first flat surface having a first spiral groove therein, the spiral groove formed of a plurality of tracks, having progressively smaller radii and including at least a first innermost track and a first outermost track, the first cam further including a first return slot connecting the first innermost track to the first outermost track, with the tracks and first return slot forming a first continuous groove on the first flat surface;

C. a second cam pivotally mounted in the cam chamber comprising a flat circular plate having gear teeth about a peripheral edge and having at least a first flat surface having a second spiral groove in the first flat surface, the second spiral groove formed of a plurality of tracks having progressively smaller radii and including at least a second innermost track and a second outermost track, the second cam further including a second return slot connecting the second innermost track to the second outermost track, with the tracks and second return slot forming a continuous groove on the first flat surface;

D. a first cam follower slidably received by the first cam continuous groove;

E. a second cam follower slidably received by the second cam continuous groove;

F. a first cutting arm having two ends and an intermediate section, one end of the first cutting arm having a first cutter with a cutting edge extending away from the body through the frontal opening and the other end pivotally mounted to the first cam follower;

G. a second cutting arm having two ends and an intermediate section, one end with a second cutter having a cutting edge extending away from the body through the frontal opening and the other end of the cutting arm pivotally mounted to the second cam follower, the first cutting arm and the second cutting arm pivotally connected to each other and the body at their respective intermediate sections and the cutting edge of the first cutting arm facing the cutting edge of the second cutting arm;

H. a gear pivotally attached to the body and engaged with the gear teeth of the first cam and the second cam;

I. means for applying a rotational torque to the first cutting arm about an axis parallel to the axis passing through the first cam and for applying a rotational torque to the second cutting arm about an axis parallel to the axis passing through the second cam; and J. a motor received in the motor chamber of the body and connected to the gear so that when the motor is energized, it rotates the gear.

45. A device for raising and lowering a window on a guide track comprising:

A. a base;

B. a cam pivotally mounted to the base comprising a flat plate having at least a first flat surface and having a spiral groove therein, the spiral groove formed of a plurality of tracks having progressively smaller radii and including at least an innermost track and an outermost track, the cam further including a return slot connecting the innermost track to the outermost track, with the tracks and return slot forming a continuous groove on the first flat surface;

C. means for rotating the cam about an axis passing through the cam centrally positioned with respect to the spiral groove;

D. a cam follower slidably received in the continuous groove of the cam;

E. a raising and lowering plate;

F. a driving arm having two ends, one end pivotally mounted to the cam follower and the other end pivotally mounted to the cam raising and lowering plate, and pivotally mounted to the base intermediate its ends so that the driving arm can rotate about an axis parallel to the axis passing through the cam;

G. a guiding arm having two ends, one end pivotally mounted to the base and the other end pivotally mounted to the raising and lowering plate and H. means for connecting the raising and lowering plate to the window.

46. The device for raising and lowering a window on a guide track of claim 45 wherein the cam is circular in shape and has gear teeth about a peripheral edge and the means to rotate the cam include a gear engaged with the gear teeth of the cam and a motor attached to the gear.

47. The device for raising and lowering a window on a guide track of claim 45 wherein the means to connect the raising and lowering plate to the window includes means of adjusting transverse movement of the attachment plate with respect to the movement of the window.

48. The device for raising and lowering a window on a guide track of claim 47 wherein the means to adjust the transverse movement of the raising and lowering plate with respect to the movement of the window includes at least one spring having one end mounted to the raising and lowering plate and its other end mounted to the window.

49. A device for raising and lowering comprising:

A. a base;

B. a cam pivotally mounted to the base comprising a flat plate having at least a first flat surface and having a spiral groove therein, the spiral groove formed of a plurality of tracks having progressively smaller radii and including at least an innermost track and an outermost track, the cam further including a return slot connecting the innermost track to the outermost track, with the tracks and return slot forming a continuous groove on the first flat surface;

C. means for rotating the cam about an axis passing through the cam centrally positioned with respect to the spiral groove;

D. a cam follower slidably received in the continuous groove of the cam;

E. a raising and lowering plate;

F. a driving arm having two ends, one end pivotally mounted to the cam follower and the other end pivotally mounted to the raising and lowering plate, and pivotally mounted to the base intermediate its ends so that the driving arm can rotate about an axis parallel to the axis passing through the cam; and G a guiding arm having two ends, one end pivotally mounted to the base and the other end pivotally mounted to the attachment plate.

* * * * *